UNITED STATES PATENT OFFICE.

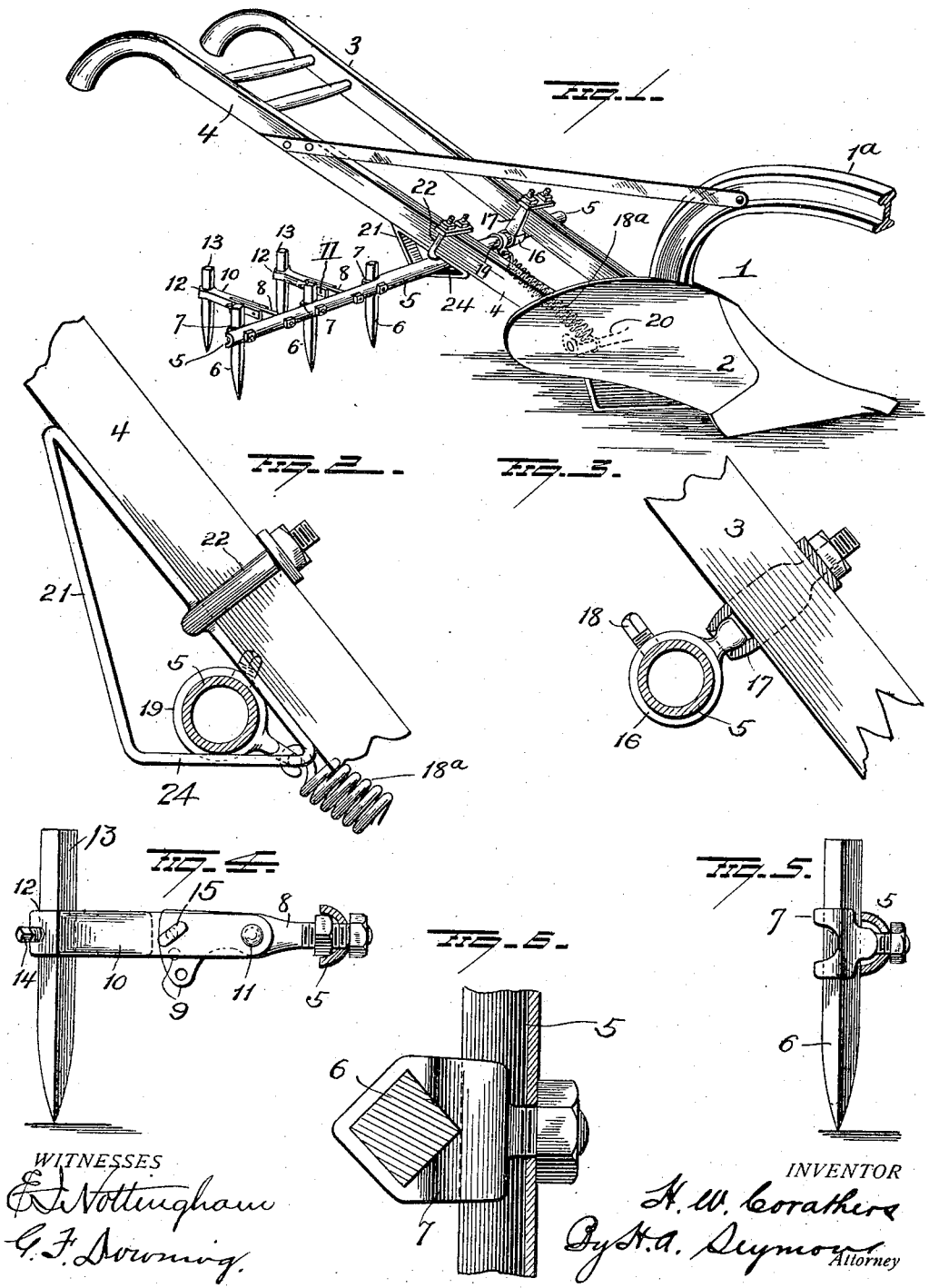

HARLEY W. CORATHERS, OF VAN WERT, OHIO.

HARROW ATTACHMENT FOR PLOWS.

1,132,563.  Specification of Letters Patent.  Patented Mar. 23, 1915.

Application filed January 27, 1914. Serial No. 814,676.

*To all whom it may concern:*

Be it known that I, HARLEY W. CORATHERS, of Van Wert, in the county of Van Wert and State of Ohio, have invented certain new and useful Improvements in Harrow Attachments for Plows; and I do hereby declare the following to be a full, clear, and exact description of the invention, such as will enable others skilled in the art to which it appertains to make and use the same.

This invention relates to improvements in harrow attachments for plows, and more particularly to such as are adaptable for use on walking plows,—the object of the invention being to so construct and arrange a harrow attachment that it will readily adapt itself to conditions of the ground; so that the harrow will be so positioned that it will effectually break up the clods promptly when the furrow is turned by the mold board of the plow; so that its attachment to the handles of the plow may be readily adjusted and operated without undue side draft; so that the harrow shall be held properly and yielding to its work, and so that the harrow will be raised when the plow is raised.

With these and other objects in view, the invention consists in certain novel features of construction and combination of parts as hereinafter set forth and pointed out in the claims.

In the accompanying drawings; Figure 1 is a perspective view of a plow showing the application of my improvements thereto; and Figs. 2 to 6 are separate views of the attachment.

1 represents a walking plow comprising a beam 1ª, a plow body 2 and handles 3, 4, and 5 represents the frame of the harrow attachment. This frame may conveniently consist of a tubular bar or pipe having a portion thereof cut away to form bearings for harrow teeth 6, which latter are secured to the bar by means of clips 7. Alternating with the teeth 6, arms 8 are secured to the bar or frame 5 and project laterally therefrom. The outer ends of these arms are made segmental in shape and each is provided with a plurality of holes 9. Bifurcated arms 10 embrace the arms 8 and are pivotally connected at their inner ends thereto by means of suitable bolts or rivets 11 and each bifurcated arm is provided at its free end with an angular eye 12 for the reception of a harrow tooth 13, the latter being secured in place by means of a set screw 14. The parallel members of each bifurcated arm 10 are provided with holes adapted to be made to aline with any one of the holes 9 in the segmental portion of arm 8 for the accommodation of a cotter pin 15 to hold the tooth carrying arm 10 normally rigid. By this construction, the rear teeth 13 may be adjusted vertically.

The bar or frame 5 of the harrow is connected with the handle 3 of the plow (which is the handle nearest the landside of the plow) by means of a swiveling coupling comprising collar 16 and a clip 17 swiveled thereto. The collar 16 is adjustably secured to the bar 5 by means of a set screw 18 and the clip is swiveled to the collar in any suitable manner and secured to the handle 3 in such position that the bar or frame of the harrow will project laterally from the plow structure just rearwardly of the rear, upper end of the mold board of the plow body. The harrow will thus be disposed in such position that its teeth will engage the soil immediately after the furrow has been turned and will operate effectually to break the clods of dirt while they are more or less moist. By attaching the bar or frame of the harrow to the handle 3 of the plow, through the medium of a swivel connection as above described, the harrow will be free to rise and fall to accommodate itself to the condition of the earth upon which it operates, but in order that the harrow (which is simple and light in construction) shall be held down yieldingly to its work, a spring 18ª may be employed,—one end of said spring being connected with the bar or frame 5 (through the medium of a collar 19) and the other end being connected with the brace 20 or any convenient part of the plow body.

The bar or frame 5 of the harrow passes through a guide bracket 21 secured by means of a clip 22, to the handle 4 of the plow. This bracket permits free vertical play of the harrow but its lower member 24, which is disposed under the bar 5, will engage said bar and raise the harrow when the plow is raised.

Various slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. The combination with a bar constituting a harrow frame, and harrow teeth secured to said bar, of a swiveling coupling having its respective members adapted for adjustable connection with said bar and with a handle of the plow, and a spring attached at one end to said swiveled bar and adapted for attachment at its lower end to a part of the plow body.

2. The combination with a plow and a clip adjustably secured to the landside handle of the plow, of a harrow comprising a bar, a collar secured to said bar, and a swivel connection between said collar and clip.

3. The combination with a plow and a harrow, of a swiveling coupling having its respective members adapted for adjustable connection with a handle of the plow and with said harrow, and a spring connected with the harrow near said swiveling coupling and adapted to be connected with the plow at a point below the attachment of the harrow with the plow handle.

4. The combination with a bar constituting a harrow frame, and harrow teeth carried by said bar, of a swiveling coupling adjustably attached to said bar for connecting the same to one handle of a plow, a triangular guide bracket through which said bar passes and in which it has vertical play, and means for securing said guide bracket to the other handle of the plow.

5. The combination with a plow comprising a beam, a plow body and plow handles, of a bar, a swiveling coupling having its respective members adjustably connected with one plow handle and with said bar, the latter projecting laterally beyond the other plow handle, a guide bracket secured to the last-mentioned plow handle and through which bracket the bar passes, said bracket having an elongated horizontal base portion, harrow teeth carried by said bar, and a spring attached at one end to said bar and at the other end to a part of the plow body.

6. The combination with a plow comprising a beam, a plow body and handles secured to the beam, of a harrow, a swiveling coupling having its members connected respectively with the frame of the harrow and with the handle nearest the landside of the plow body, said harrow projecting laterally beyond the handle nearest the mold board of the plow body, and a bracket secured to the last-mentioned handle and having an elongated base portion disposed under a part of the frame of the harrow.

7. The combination with a plow comprising a beam, a plow body and handles secured to said beam, of a harrow, a swiveling coupling having its members connected respectively with the frame of the harrow and with the handle nearest the landside of the body and extending laterally beyond the other handle, and a bracket secured to the last-mentioned handle for guiding the harrow, said bracket having an elongated horizontal base portion to receive and support the harrow.

In testimony whereof, I have signed this specification in the presence of two subscribing witnesses.

HARLEY W. CORATHERS.

Witnesses:
S. C. HILL,
R. S. FERGUSON.

Copies of this patent may be obtained for five cents each, by addressing the "Commissioner of Patents. Washington, D. C."